UNITED STATES PATENT OFFICE 2,592,529

2-AMINO-7-HETEROCYCLICAMINO-THIOXANTHENES

Edward Delbert Amstutz, Bethlehem, Pa., assignor to The Wm. S. Merrell Company, Cincinnati, Ohio, a corporation of Delaware No Drawing. Original application July 23, 1946, Serial No. 685,787. Divided and this application December 6, 1950, Serial No. 199,585

4 Claims. (Cl. 260—256.5)

The present invention relates to new chemical compounds and more particularly to 2-amino-7(heterocyclic) aminothioxanthone dioxide and 2 - amino - 7(heterocyclic) aminothioxanthenol dioxide. These compounds characterized by an aminophenyl group linked to a heterocyclic substituted aminophenyl group by a carbonyl or hydroxymethylene group and a sulfone ($SO_2$) group along with amino derivatives of the same are of value for combating bacterial infections. The compounds may be represented by the following formula:

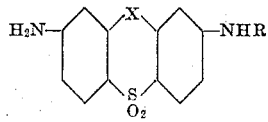

where X represents a carbonyl or hydroxymethylene group, and R a heterocyclic group selected from the group consisting of pyridyl, pyrimidyl and thiazolyl.

EXAMPLE I

2-AMINO-7-(2-PYRIMIDYL) AMINOTHIOXANTHONE DIOXIDE

This compound is conveniently prepared in a five-step process as follows:

(a) *5-nitro-2-(p-iodothiophenoxy)-benzaldehyde* p-Iodothiophenol (0.27 mole) is condensed with 5-nitro-2-chlorobenzaldehyde (0.26 mole) by refluxing in an atmosphere of nitrogen for 2 hours with sodium bicarbonate (0.27 mole) in 870 ml. of 65% alcohol. The yellow precipitate is removed from the cooled mixture by filtration and is washed with alcohol and water and recrystallized from glacial acetic acid (800 ml.).

(b) *Cyclization of 5-nitro-2-(p-iodothiophenoxy) benzaldehyde*

5 - nitro-2-(p-iodothiophenoxy) benzaldehyde (0.296 mole) is dissolved in cold sulfuric acid (1140 ml.) and the dark red solution is poured onto 1500 grams of chipped ice. The yellow precipitate is filtered, washed with water and sucked as dry as possible. The resulting mixture of 2-nitro-7-iodothioxanthone and 2-nitro-7-iodoxanthene is used without separation.

(c) *2-nitro-7-iodothioxanthone dioxide*

The mixture from step (b) is transferred to a flask containing 1500 ml. of glacial acetic acid, and chromium trioxide (1.25 moles) is added. The mixture is heated very carefully until refluxing begins. After 2½ hours the mixture is cooled, the white precipitate is filtered off, washed, dried and digested twice with acetic anhydride. 2-nitro-7-iodothioxanthone dioxide is obtained as an almost colorless crystalline powder.

(d) *2-amino-7-iodothioxanthone dioxide*

2 - nitro - 7 - iodothioxanthone dioxide (0.28 mole) is suspended in glacial acetic acid (400 ml.) and is reduced at 85° C. by a solution of stannous chloride dihydrate (1.07 moles) in acetic acid (1200 ml.) saturated with gaseous hydrogen chloride. After cooling, the cream-colored precipitate is separated by filtration and is thoroughly digested with cold water to decompose the tin complex. The resultant yellow precipitate is collected, washed and dried. It is a bright yellow powder.

(e) *2-amino-7-(2-pyrimidyl) aminothioxanthone dioxide*

A mixture of 2-amino-7-iodothioxanthone dioxide (0.013 mole), 2-aminopyrimidine (0.16 mole), finely powdered potassium carbonate (0.015 mole) and a trace of copper powder is heated on an oil bath at 195 to 205° C. for about 80 minutes under nitrogen. The cold reaction mixture is pulverized, extracted with cold water, and the residue is taken up in 5 normal nitric acid. The acid solution is filtered and then made alkaline by the addition of aqueous potassium hydroxide. The yellow precipitate is collected, washed and dried to give the 2-amino-7-(2-pyrimidyl) aminothioxanthone dioxide. The compound melts at 317–320° C. with decomposition.

EXAMPLE II

2-AMINO-7-(2-PYRIMIDYL) AMINOTHIOXANTHENOL DIOXIDE 2-amino-7-(2-pyrimidyl) aminothioxanthone dioxide is reduced by means of zinc dust in boiling acetic acid to yield the corresponding thioxanthenol dioxide derivative.

By the method of Examples Nos. I and II, a wide range of heterocyclic derivatives of 2,7-diaminothioxanthone dioxide and 2,7-diaminothioxanthenol dioxide may be prepared by condensing the 2-amino-7-iodo compound with the desired 2-amino-heterocyclic compound. 2-amino substituted heterocycles containing nitrogen or both nitrogen and sulfur in the ring may be employed, including such compounds as 2-aminopyridine, 2-aminothiazole, 2-amino-4-methyl thiazole, etc. Typical products are 2 - amino-7-[2-(4-methyl)thiazolyl] aminothioxanthone dioxide and 2-amino-7-(2-thiazolyl) aminothioxanthone dioxide. The corresponding thioxanthenol dioxide compounds may be prepared by reduction of the thioxanthone dioxide analogues, or may be prepared by the halogen-aminoheterocycle condensation of Example No. I.

The present application is a division of my prior application Serial No. 685,787 filed July 23, 1946, now abandoned.

I claim:

1. A compound represented by the formula

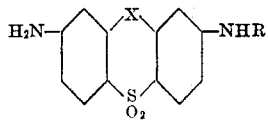

where X is a radical selected from the group consisting of carbonyl and hydroxymethylene, and R is a heterocyclic radical selected from the group consisting of pyridyl, pyrimidyl and thiazolyl.

2. The compound, 2-amino-7-(2-pyrimidyl) aminothioxanthone dioxide.

3. The compound, 2-amino-7-(2-pyrimidyl) aminothioxanthenol dioxide.

4. The compound, 2-amino-7-(2-thiazolyl) aminothioxanthone dioxide.

EDWARD DELBERT AMSTUTZ.

No references cited.